July 8, 1969 R. C. HEIDNER ET AL 3,453,812
LAWNMOWER
Filed July 20, 1965
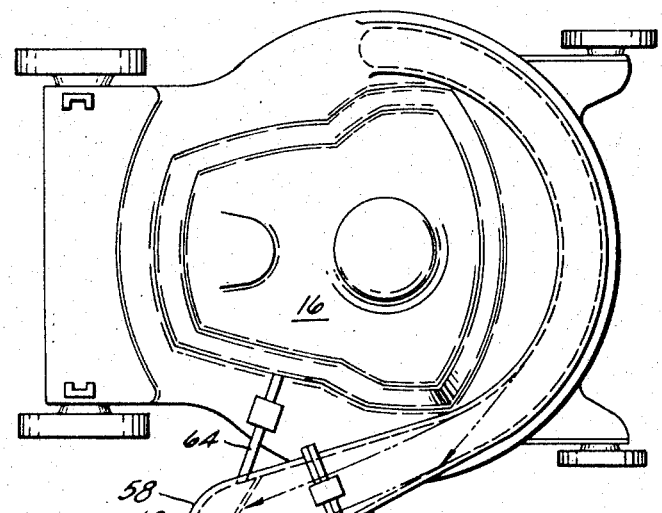
FIG. 3
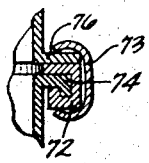
FIG. 5
FIG. 4
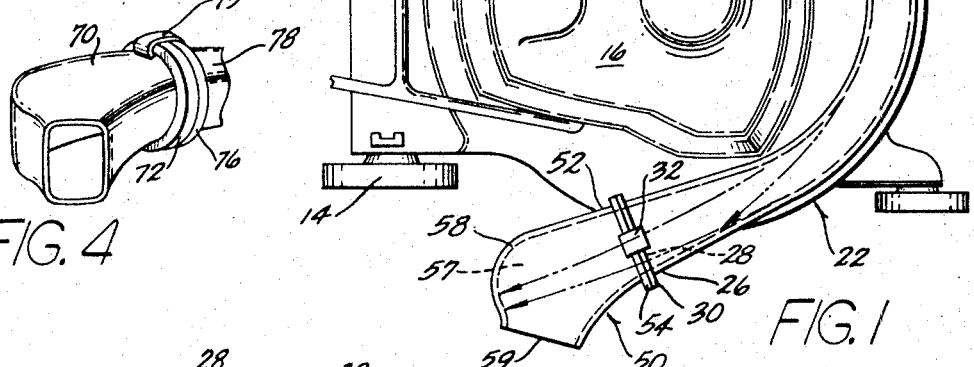
FIG. 1
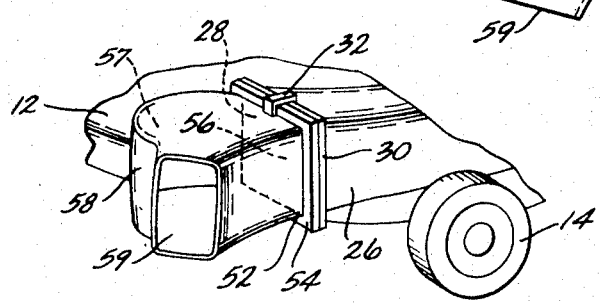
FIG. 2
INVENTORS
RICHARD C. HEIDNER
BY MAX E. GOODWIN
Wheeler, Wheeler + Wheeler
ATTORNEYS

United States Patent Office 3,453,812
Patented July 8, 1969

3,453,812
LAWNMOWER
Richard C. Heidner and Max E. Goodwin, Galesburg, Ill., assignors to Outboard Marine Corporation, Waukegan, Ill., a corporation of Delaware
Filed July 20, 1965, Ser. No. 473,364
Int. Cl. A01d 35/22
U.S. Cl. 56—25.4
8 Claims

ABSTRACT OF THE DISCLOSURE

Disclosed herein is a lawnmower comprising a housing including a discharge chute defining a passageway for the discharge of grass clippings from said housing, together with a deflector housing extending from said discharge chute and including a wall portion defining a pocket.

---

This invention relates to rotary lawnmowers, and more particularly, to discharge arrangements for rotary lawnmowers.

The principal object of the invention is to provide a rotary lawnmower having a grass discharge arrangement which allows discharge of grass clippings, and which prevents the discharge of foreign particles such as stones, wood pieces, or other hard or solid objects, to avoid injury to persons or property. In accordance with the invention, the lawnmower includes a housing having an outlet opening and a discharge chute communicating with the opening. A deflector means is removably attached to the discharge chute and is provided with a curved or dished wall portion defining a safety pocket. The pocket is generally disposed in the path of the particles discharged from the discharge chute, whereby the particles exiting from the discharge chute along various different trajectories will strike the safety pocket and be trapped in either the housing or the discharge chute. Futhermore, the safety pocket will fill with grass clippings which serve as a cushion to absorb the energy of the high velocity particles and render them harmless.

Another object of the invention is to provide a lawnmower having deflector means including a safety pocket and an oscillating diaphragm covering the safety pocket to prevent accumulated grass clippings from clogging the mower.

Another object of the invention is to provide a lawnmower having deflector means which can be adjustably positioned to selectively afford grass windrowing and grass dispersal.

Other objects and advantages will become apparent from the following description and accompanying drawings in which:

FIGURE 1 is a plan view of a rotary lawnmower incorporating various of the features of the invention;

FIGURE 2 is a perspective view of a portion of the lawnmower shown in FIGURE 1;

FIGURE 3 is a plan view similar to FIGURE 1, showing another form of the invention;

FIGURE 4 is a fragmentary, perspective view showing still another form of the invention; and FIGURE 5 is a sectional view of a portion of the lawnmower shown in FIGURE 4.

Shown in the drawings is a rotary lawnmower 10 including a housing or frame 12, wheels 14, an engine 16, a handle 18, and a cutting blade 20. The housing 12 includes a discharge chute 22 which can be formed as an integral or separate part of the housing 12 and which defines a passageway for discharge therethrough of grass clippings cut by the mower 10. The discharge chute 22 comprises an inverted channel disposed generally tangentially of the path of the blade 20. The discharge chute 22 communicates with an opening 24 in the housing 12 and upwardly increases in depth from the opening 24 toward the discharge end 26 which includes a discharge opening 28. The sweep of the blade 20 during advance of the housing will lift and project grass clippings into the discharge chute 22 and out the discharge opening 28.

The discharge end 26 of the discharge chute 22 conventionally includes means for removably mounting thereon a grass catching bag (not shown). In the disclosed construction, said mounting means includes a flange 30 and suitable fastening means in the form of clamps 32 for removably connecting the grass catching bag (not shown).

Particles, such as stones, wood pieces, or other heard objects, can be projected from the mower 10 at high velocities and can seriously injure a person or thing struck thereby. Use of the lawnmower 10, as thus far described, without a grass catching bag, as for example, when dispersing grass clippings, is generally undesirable and dangerous unless means are provided for preventing the discharge of such particles.

In accordance with the invention, deflector means is disposed on the discharge chute 22, which deflector means includes safety means disposed in the path of projected particles for preventing the discharge of foreign particles and for allowing, and selectively controlling the direction of, grass clipping discharge. The safety means can fill with grass clippings to provide a cushion for absorbing the kinetic energy of the projected particles. The deflector means also includes an adjustable means for selectively affording grass windrowing and grass dispersal.

In the preferred embodiment of the invention, the deflector means includes an arcuately-shaped deflector housing 50 removably attached to the discharge end 26 of the discharge chute 22. The housing 50 includes an end 52 having a flange 54 and an inlet opening 56 of generally identical configuration to the discharge opening 28 of the discharge chute 22. Any suitable means can be employed for removably attaching the housing 50 to the discharge chute 22. For example, if the mower is adapted for use with a grass catching bag, the existing clamps 32 (as shown in the preferred embodiment) can be employed to securely hold the flanges 30 and 54 together. Otherwise, clamps or other suitable fastening means (not shown) can be carried on the deflector housing 50 to provide a readily attachable unit.

The safety means included in the housing 50 is in the form of a safety pocket 57 defined by the curved or dished wall portion 58 of the housing 50, which pocket 57 is disposed relatively near an outlet opening 59. The curved wall portion 58 is disposed in the path of particles exiting for the discharge opening 28 (as shown by the arrows in FIGURE 1) to deflect the particles striking the wall portion 58 in a direction away from the opening 59 to thereby trap the particles in either of the deflector housing 50 or the discharge chute 22.

In the course of use, grass clippings will accumuate in the safety pocket 57. Such accumulated clippings will serve as a cushion to absorb the energy of the projected particles.

In an alternative construction shown in FIGURE 3, means are provided for preventing the grass clippings from clogging the discharge chute 22 by loosening accumulated grass clippings which may tend to collect around the opening 59. In the preferred embodiment, a rupturable and/or oscillatable diaphragm 60 is disposed in covering relation to the pocket 57 and is sealingly connected to the housing 50 at the margins of the curved wall portion 58. The diaphragm 60, in conjunction with the curved wall portion 58, defines a closed chamber 62.

Means are provided for oscillating the diaphragm 60. In the preferred embodiment, said means comprises a tube or conduit 64 connected between the chamber 62 and a source of pulsating pressure such as the crankcase of a two-stroke engine. The pressure pulses accordingly vary phragm 60 to thereby dislodge accumulated grass clippings. Projected particles will rupture the diaphragm 60 and be trapped by the pocket 57.

If desired, means can be provided to afford selective positioning of the deflector housing without removal of the deflector housing. In the embodiment, shown in FIGURES 4 and 5, such means comprises a deflector housing 70 (similar to the housing 50 previously described) including an annular mounting ring 72 rotatably receiving an annnular mounting flange 74 on the deflector housing 70. The mounting ring 72 is removably clamped, as by suitable clamps 73 similar to those previously described, to a corresponding annular flange 76 on a discharge chute 78. In this manner, the deflector housing 70 can be rotated relative to the discharge chute 76 and can be selectively positioned to any of the various positions affording various grass discharge conditions, such as windrowing or dispersal.

Various of the features of the present invention are set forth in the following claims.

What is claimed is:

1. A lawnmower comprising a housing including an opening, and a discharge chute communicating with said opening, extending horizontally tangentially from said housing for discharging grass, and having a discharge end including a discharge opening, and deflector means removably connected to said discharge end, said deflector means including safety means in the path of tangentially horizontally exiting foreign particles and grass for preventing the discharge of said foreign particles from said discharge chute.

2. A lawnmower is accordance with claim 1 wherein said deflector means includes adjustable means for selectively affording grass windrowing and grass dispersing.

3. A lawnmower in accordance with claim 1 wherein said deflector means comprises a housing removably attached to said discharge end of said discharge chute and having an inlet opening communicating with said discharge opening and an outlet opening, said housing also including a wall portion defining a pocket, said pocket being disposed proximate said outlet opening and in the path of foreign particles exiting horizontally from said discharge chute whereby said particles will strike said wall portion and be deflected in a direction away from said outlet opening to thereby trap the particles in either of said housing and said discharge chute.

4. A lawnmower comprising a housing including a discharge chute defining a passageway for the discharge of grass clippings from said housing, a deflector housing extending from said discharge chute and including a wall portion defining a pocket and a diaphragm disposed in covering relation to said pocket to define a chamber between said wall portion and said diaphragm, and means for oscillating said diaphragm for dislodging grass clippings which accumulate thereabout.

5. A lawnmower in accordance with claim 4 including a closed crankcase subject to pulsating pressure conditions and wherein said oscillating means comprises a conduit connected between said chamber and said crankcase to provide pulsating pressure changes in said chamber.

6. An attachment for a lawnmower having a discharge chute adapted for horizontally tangentially discharging grass, said attachment comprising a housing having means for removable attachment of said housing to the discharge chute and having an outlet opening, said housing including a wall portion defining a pocket, said pocket being disposed proximate said opening in the path of non-grass particles exiting horizontally from the discharge chute whereby said particles will strike said wall portion and be deflected in a direction away from said opening to thereby trap the particles in one of said housing and the discharge chute.

7. An attachment in accordance with claim 6 wherein said attachment includes a diaphragm disposed in covering relation to said pocket to define a chamber between said wall portion and said diaphragm and a conduit having an end connected to said wall portion and communicating with said chamber and having another end adapted for connection to a source of pulsating pressure.

8. An attachment for a lawnmower having a discharge chute adapted for use with a grass catching bag, said attachment comprising a housing having means for removable attachment to the discharge chute, said housing also including other means for preventing the discharge of foreign particles and for allowing the discharge of grass clippings therefrom, and an oscillatable diaphragm in the path of exiting foreign particles and grass from said housing for preventing accumulations of grass clippings from blocking said discharge chute.

References Cited

UNITED STATES PATENTS

| | | | |
|---|---|---|---|
| 2,903,837 | 9/1959 | Titzer | 56—202 |
| 3,006,128 | 10/1961 | Weiland | 56—25.4 |
| 3,195,297 | 7/1965 | Weiland | 56—25.4 |
| 3,220,170 | 11/1965 | Smith et al. | 56—255 |

ABRAHAM G. STONE, *Primary Examiner.*

P. A. RAZZANO, *Assistant Examiner.*

PO-1050
(5/69)

UNITED STATES PATENT OFFICE
CERTIFICATE OF CORRECTION

Patent No. 3,453,812      Dated July 8, 1969

Inventor(s) R.C. Heidner et al (Outboard Marine Corporation)

It is certified that error appears in the above-identified patent and that said Letters Patent are hereby corrected as shown below:

Column 3, Line 5,    After "vary" INSERT --the pressure in the chamber 62 and oscillate the dia--

Column 3, Line 8,    "pocket 57" should read --pocket 58--

SIGNED AND
SEALED

NOV 18 1969

(SEAL)
Attest:

Edward M. Fletcher, Jr.
Attesting Officer

WILLIAM E. SCHUYLER, JR.
Commissioner of Patent